(12) United States Patent
Umehara et al.

(10) Patent No.: US 9,151,473 B2
(45) Date of Patent: Oct. 6, 2015

(54) ELECTRONIC APPARATUS, LIGHT-TRANSMISSIVE COVER PLATE, AND PORTABLE DEVICE

(71) Applicant: KYOCERA Corporation, Kyoto-shi, Kyoto (JP)

(72) Inventors: Motohiro Umehara, Yasu (JP); Satoru Tsubokura, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/455,292

(22) Filed: Aug. 8, 2014

(65) Prior Publication Data

US 2015/0176816 A1 Jun. 25, 2015

(30) Foreign Application Priority Data

Dec. 24, 2013 (JP) .................................. 2013-264784

(51) Int. Cl.
*H05K 5/00* (2006.01)
*F21V 15/01* (2006.01)
*F21V 33/00* (2006.01)

(52) U.S. Cl.
CPC ................. *F21V 15/01* (2013.01); *F21V 33/00* (2013.01)

(58) Field of Classification Search
USPC ............................................ 361/753, 679.01
See application file for complete search history.

(56) References Cited

U.S. PATENT DOCUMENTS

| 2008/0305005 | A1* | 12/2008 | Kurokawa et al. ........... 422/68.1 |
| 2012/0249281 | A1 | 10/2012 | Campbell et al. |
| 2013/0236699 | A1 | 9/2013 | Prest et al. |
| 2013/0328792 | A1 | 12/2013 | Mayers et al. |
| 2014/0023430 | A1 | 1/2014 | Prest et al. |
| 2014/0030443 | A1 | 1/2014 | Prest et al. |
| 2014/0139978 | A1* | 5/2014 | Kwong .................... 361/679.01 |

FOREIGN PATENT DOCUMENTS

| JP | H08-083802 A | 3/1996 |
| JP | 2002-091329 A | 3/2002 |
| JP | 2002-201096 | 7/2002 |
| JP | 2002-201096 A | 7/2002 |
| JP | 2002-333502 A | 11/2002 |
| JP | 2008-111984 A | 5/2008 |
| JP | 2011-061316 | 3/2011 |
| JP | 2013-255212 A | 12/2013 |
| WO | 2008-093704 A1 | 8/2008 |
| WO | 2013-179629 A1 | 12/2013 |

OTHER PUBLICATIONS

International Search Report Dated Mar. 31, 2015, issued for International Application No. PCT/JP2014/084176.

* cited by examiner

*Primary Examiner* — Andargie M Aychillhum
(74) *Attorney, Agent, or Firm* — Procopio, Cory, Hargreaves & Savitch LLP (57) ABSTRACT

An electronic apparatus and a light-transmissive cover plate are disclosed. The electronic apparatus includes an image display device; and a light-transmissive cover plate that includes a first surface facing the image display surface and a second surface positioned on the opposite side of the first surface. The light-transmissive cover plate is made of a single crystal that contains alumina ($Al_2O_3$) as a main component and has a step-terrace structure in at least a portion of the second surface.

15 Claims, 13 Drawing Sheets

ELECTRONIC APPARATUS, LIGHT-TRANSMISSIVE COVER PLATE, AND PORTABLE DEVICE

CROSS-REFERENCE TO RELATED APPLICATION

The present application claims priority under 35 USC §119 to Japanese Patent Application No. 2013-264784 filed on Dec. 24, 2013, entitled "Electronic Apparatus and Light-Transmissive Cover Plate", the entirety of which is incorporated herein by reference.

BACKGROUND OF THE INVENTION

1. Field

The present invention relates to an electronic apparatus and a light-transmissive cover plate.

2. Background

In the related art, an electronic apparatus such as a digital camera or a mobile phone with an image display device such as a liquid crystal panel or an organic electroluminescent (EL) panel is used. Recently, portable electronic apparatuses such as smartphones, tablets, and smartwatches, which display a relatively large image on the image display device and includes an input device such as a touch panel, have become widespread. A light-transmissive cover plate for protecting the image display is arranged in the portable electronic apparatus. If the electronic apparatus is dropped, then the light-transmissive cover plate may be subjected to a strong impact.

SUMMARY

An electronic apparatus or portable device comprises an image display device that includes an image display surface and a light-transmissive cover plate. The light-transmissive cover plate includes a first surface facing the image display surface and a second surface positioned on the opposite side of the first surface. The light-transmissive cover plate is made of a single crystal body that contains alumina ($Al_2O_3$) as a main component and has a step-terrace structure in at least a portion of the second surface.

Also disclosed is a light-transmissive cover plate for an electronic apparatus or a portable device in which the light-transmissive cover plate is arranged such that at least a portion thereof faces an image display surface of an image display device. The light-transmissive cover plate includes a first surface and a second surface positioned on the opposite side of the first surface. The light-transmissive cover plate is made of a single crystal body that contains alumina ($Al_2O_3$) as a main component and has a step-terrace structure in at least a portion of the second surface.

Accordingly, the light-transmissive cover plate in the above-described embodiments resists breaking when subjected to a strong impact. It also has high heat dissipation so that the heat emitted from an electronic circuit and the like can be efficiently released to the outside.

DETAILED DESCRIPTION

Hereinafter, an embodiment of the present invention will be described with reference to the accompanying drawings.

<External Appearance of Electronic Apparatus>

Figure 1A:
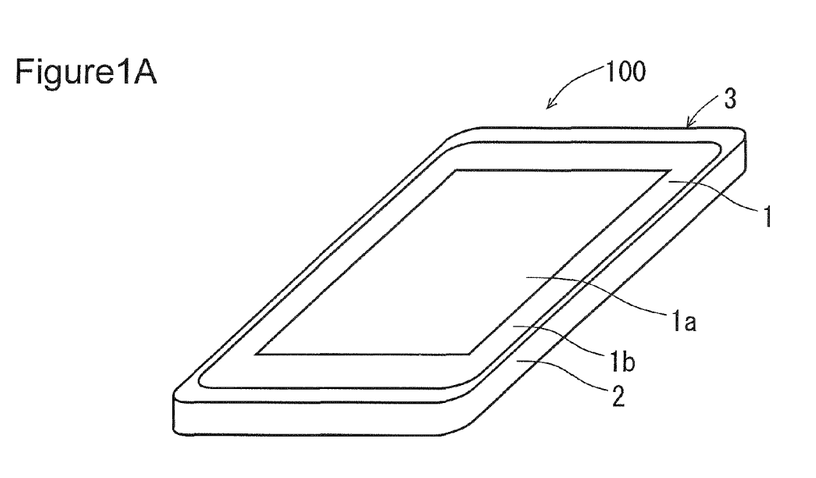
FIG. 1A is a perspective view illustrating the external appearance of an electronic apparatus.
Figure 1B:
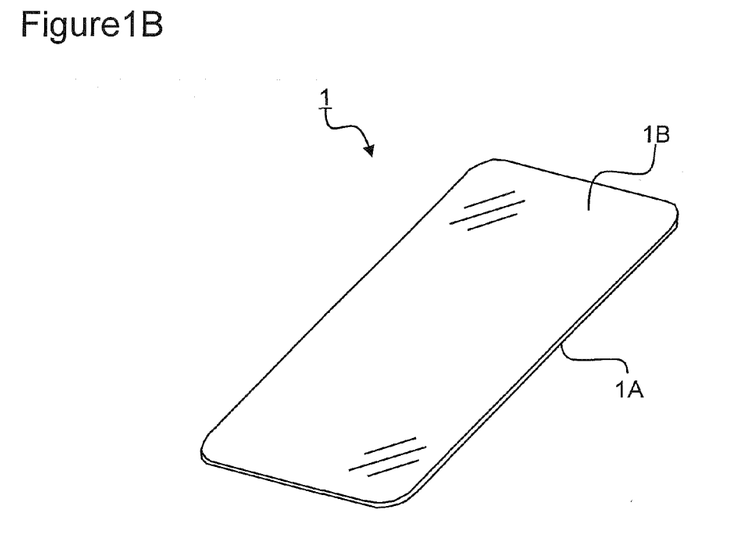
FIG. 1B is a perspective view illustrating a light-transmissive cover plate included in the electronic apparatus illustrated in FIG. 1A.

FIG. 1A is a perspective view schematically illustrating an electronic apparatus 100 which is an embodiment of the electronic apparatus of the present invention. FIG. 1B is a perspective view schematically illustrating a light-transmissive cover plate 1 which is included in the electronic apparatus illustrated in FIG. 1A and is an embodiment of the light-transmissive cover plate of the present invention.

Figure 2:
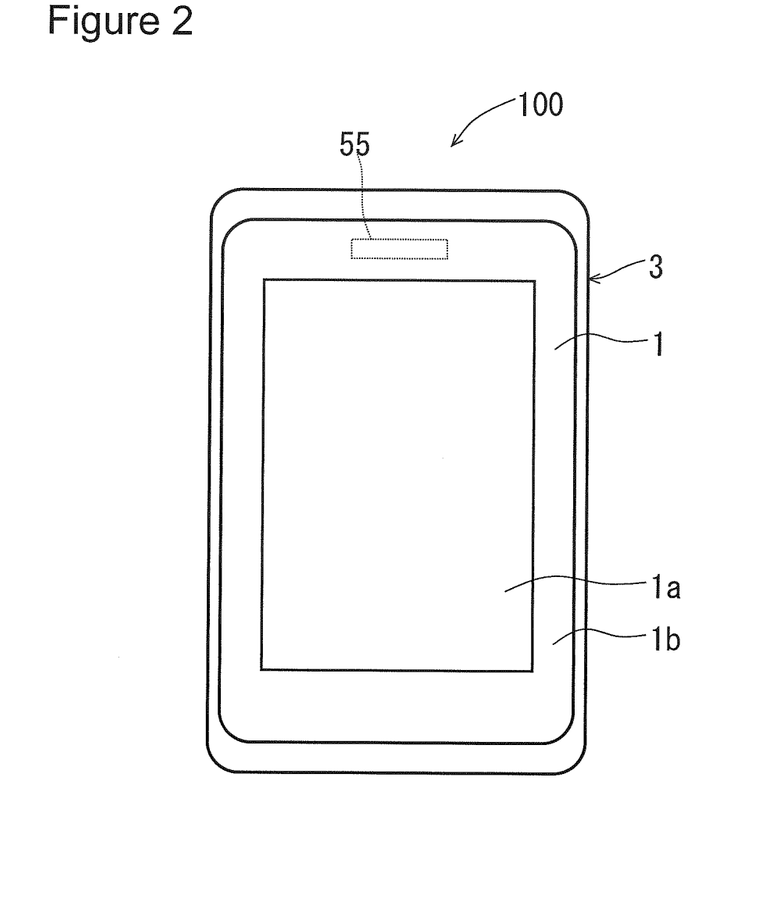
FIG. 2 is a front view illustrating the external appearance of the electronic apparatus.

FIG. 2 is a front view illustrating the electronic apparatus 100.

Figure 3:
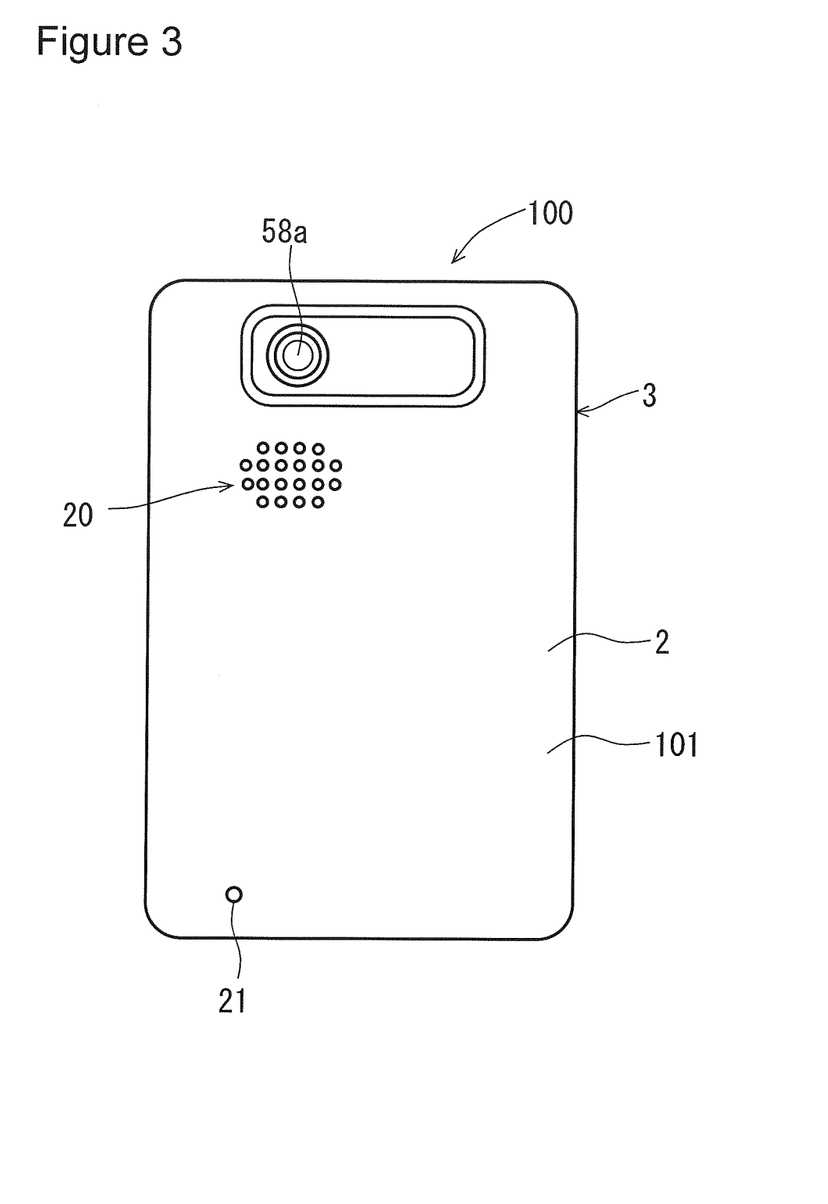
FIG. 3 is a rear view illustrating the external appearance of the electronic apparatus.

FIG. 3 is a rear view illustrating the electronic apparatus 100. The electronic apparatus 100 according to the present embodiment is, for example, a mobile phone.

Figure 4:
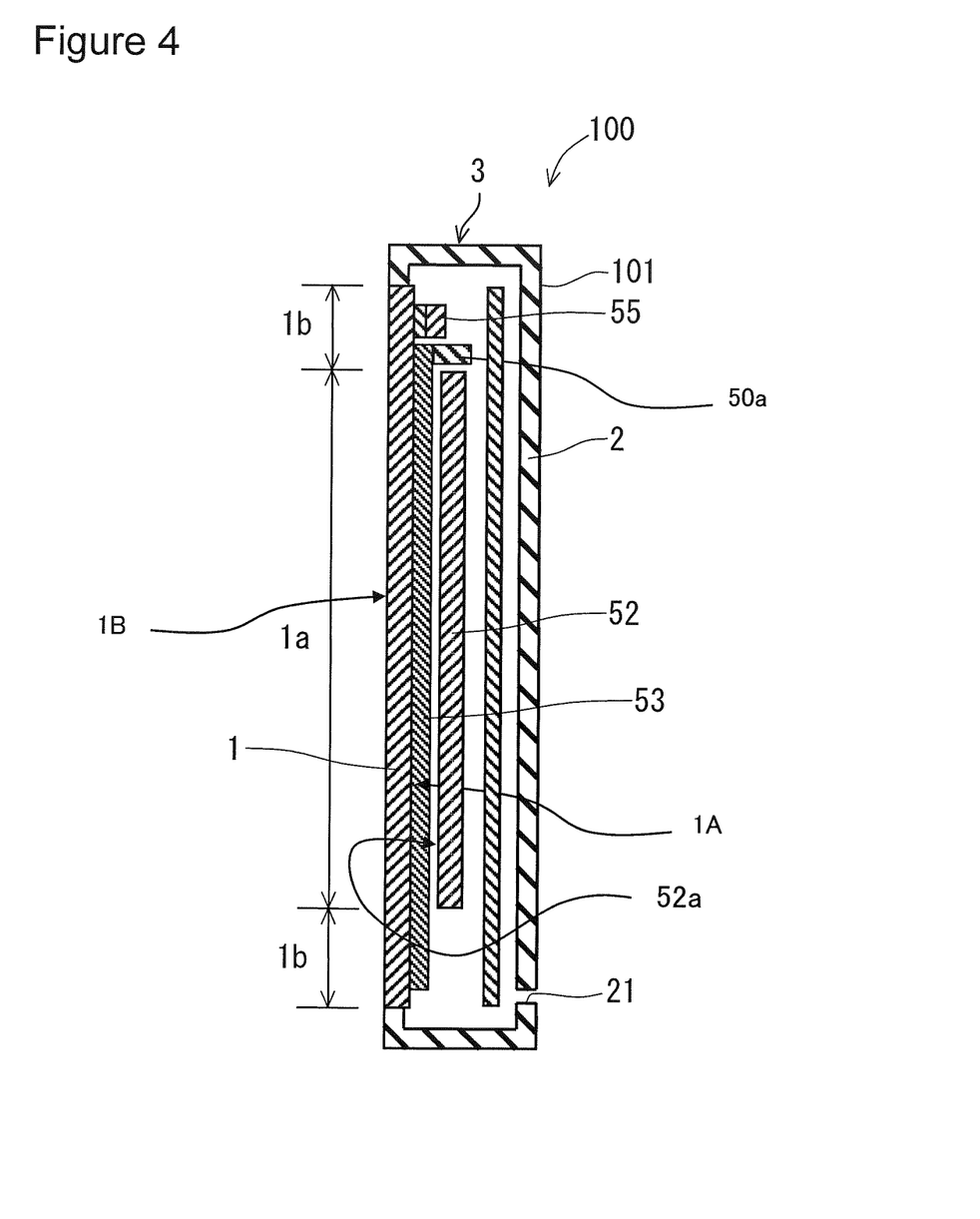
FIG. 4 is a cross-sectional view illustrating the electronic apparatus.

FIG. 4 is a cross-sectional view schematically illustrating the electronic apparatus 100.

As shown in FIGS. 1A to 4, the electronic apparatus 100 includes an image display device 52 including the light-transmissive cover plate 1, a casing 2, and an image display surface 52a. The light-transmissive cover plate 1 is a plate having an approximate rectangular shape from a top view. An apparatus case 3 is configured by combining the light-transmissive cover plate 1 and the casing 2. The light-transmissive cover plate 1 includes a first surface 1A facing the image display surface 52a and a second surface 1B arranged on the opposite side of the first surface 1A.

The light-transmissive cover plate 1 includes a display portion 1a corresponding to the portion of the image display device 52 on which various pieces of information such as characters, symbols, and drawings are displayed. The display portion 1a has a rectangular shape in a top view. A peripheral edge area 1b surrounds the display portion 1a of the light-transmissive cover plate 1. The color of the peripheral edge area 1b may be black due to a film or the like attached thereto. The peripheral edge area 1b corresponds to a non-display portion of the image display device 52. A touch panel 53 described below is attached to an inner principal surface of the light-transmissive cover plate 1. A user can give various instructions with respect to the electronic apparatus 100 through the touch panel 53 by operating the display portion 1a of the second surface 1B of the light-transmissive cover plate 1 with a finger or the like.

Figure 5A:
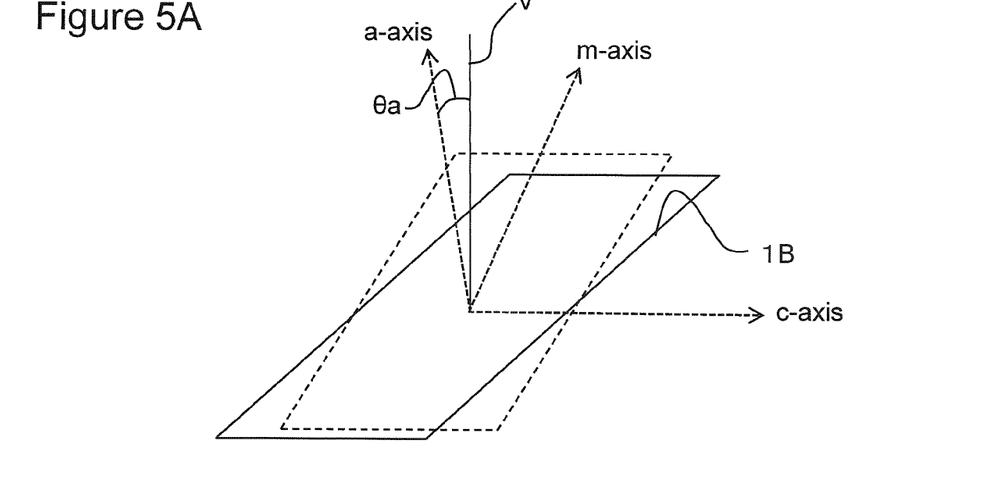
FIG. 5A is a conceptual view describing an inclination direction of a second surface of a light-transmissive cover plate.
Figure 5B:
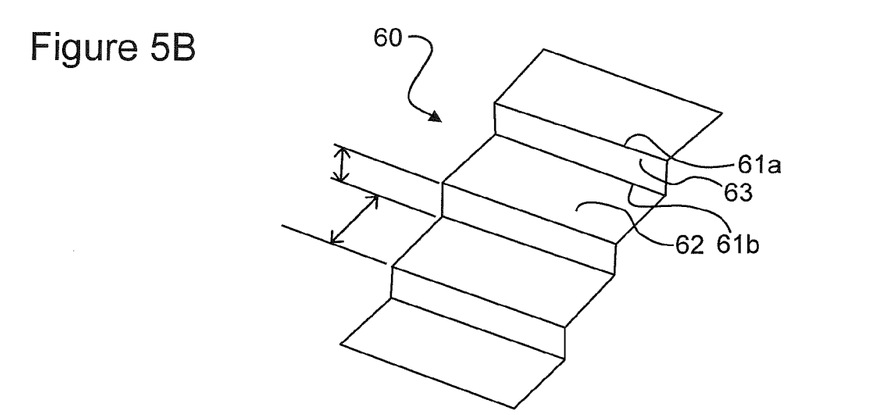
FIG. 5B is a perspective view schematically illustrating the second surface by enlarging a portion thereof.
Figure 5C:
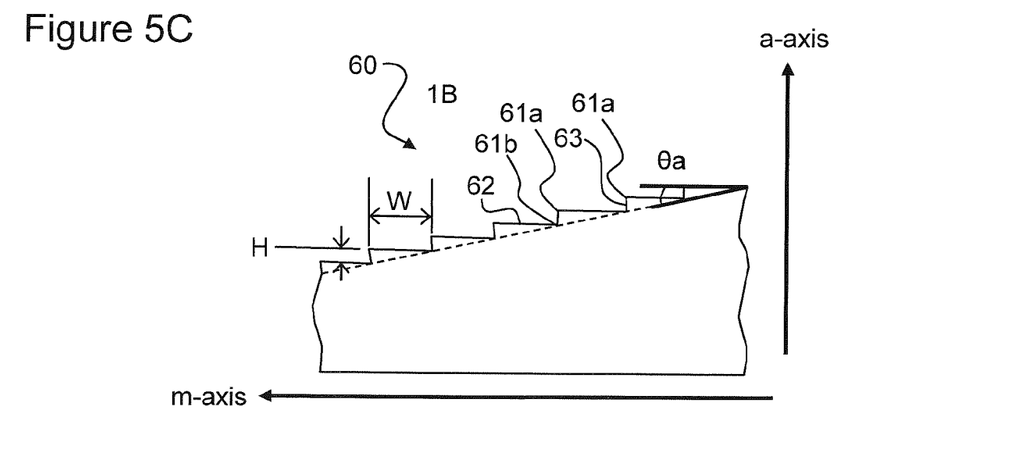
FIG. 5C is a cross-sectional view illustrating the light-transmissive cover plate.

FIGS. 5A to 5C are views describing the second surface 1B. FIG. 5A is a conceptual view describing an inclination direction of the second surface 1B. FIG. 5B is a perspective view schematically illustrating the second surface 1B by enlarging a portion thereof. FIG. 5C illustrates a cross section in which the light-transmissive cover plate 1 is cut by a plane perpendicular to an m-plane, that is a plane in parallel with an m-axis, in sapphire.

The light-transmissive cover plate 1 is made of a single crystal containing alumina ($Al_2O_3$) as a main component and has a step-terrace structure 60 on at least a portion of the second surface 1B. The single crystal containing alumina ($Al_2O_3$) as a main component is generally referred to as sapphire and resists being damaged or broken. In the present embodiment, the single crystal containing alumina ($Al_2O_3$) as a main component is referred to as sapphire, and the light-transmissive cover plate 1 may also be referred to as the sapphire cover plate. In the present embodiment, the meaning of "main component" is that the component is contained by the amount of at least 50% by mass and preferably 70% by mass. The purity content of $Al_2O_3$ of the light-transmissive cover plate 1 is preferably 99% in terms of the resistance to damage and breaking. In the present embodiment, the first surface 1A has a step-terrace structure (not-illustrated) which is the same as the step-terrace structure 60 of the second surface 1B.

The step-terrace structure 60 may have steps. As illustrated in FIG. 5B, the step-terrace structure 60 has a horizontal terrace portion 62 and a step portion 63 approximately perpendicular to the terrace portion 62. An upper ridge 61a and a lower ridge 61b are formed at the boundary of the terrace portion 62 and the step portion 63. It is desirable that the step-terrace structure 60 be continuously formed across the entirety of the second surface 1B, but the step-terrace structure may be partially formed. In the present embodiment, a step height H of the step-terrace structure 60 is approximately $5\times10^{-10}$ m and a terrace width W of the step-terrace structure 60 is approximately $2\times10^{-7}$ m.

The second surface 1B of the present embodiment is a plane inclined from an a-plane of sapphire (11-20) plane. An inclined angle $\theta_a$ is approximately 0.5°. More specifically, as depicted by FIG. 5A, a virtual line V perpendicular to the second surface 1B is inclined with respect to an m-axis in sapphire. The second surface 1B as a reference of the inclined angle in the present embodiment corresponds to a virtual plane containing a plurality of lower ridges 61b.

As shown in FIG. 5C, the inclined angle $\theta_a$ corresponds to an angle formed by a straight line connecting the plurality of lower ridges 61b and the a-plane of sapphire (11-20) plane, in the cross section of the second surface 1B.

The step-terrace structure 60 is a structure generated due to the misalignment that occurs when the second surface 1B of the light-transmissive cover plate 1 is shifted from a crystal surface, which is the a-plane in the present embodiment, of sapphire in the light-transmissive cover plate 1. The step-terrace structure 60 is a state in which the atoms in the vicinity of the second surface 1B of the light-transmissive cover plate 1 are arranged in a form of steps according to the actual crystal structure. For example, the light-transmissive cover plate 1 having the step-terrace structure 60 can be formed by polishing sapphire by mechanical polishing or chemical mechanical polishing (so-called CMP), to form a precursor of the light-transmissive cover plate 1. After the precursor is formed, performing a heat treatment on the precursor at a temperature of approximately 500° C. to 1500° C., will rearrange the atoms on the surface of the precursor according to the crystal structure.

The details of the step-terrace structure 60 such as the degree of the step height H or the terrace width W of the step-terrace structure 60 can be modified by changing the inclination direction of the inclined angle of the second surface 1B with respect to the crystal structure, the magnitude of the inclined angle of the second surface 1B with respect to the crystal structure, conditions of the heat treatment, and the like. That is, the details of the step-terrace structure 60 such as the degree of the step height H or the terrace width W of the step-terrace structure 60 can be adjusted by changing the inclination direction of the inclined angle, the magnitude of the inclined angle of the second surface 1B with respect to the crystal structure, or the conditions of the heat treatment.

Figure 6:
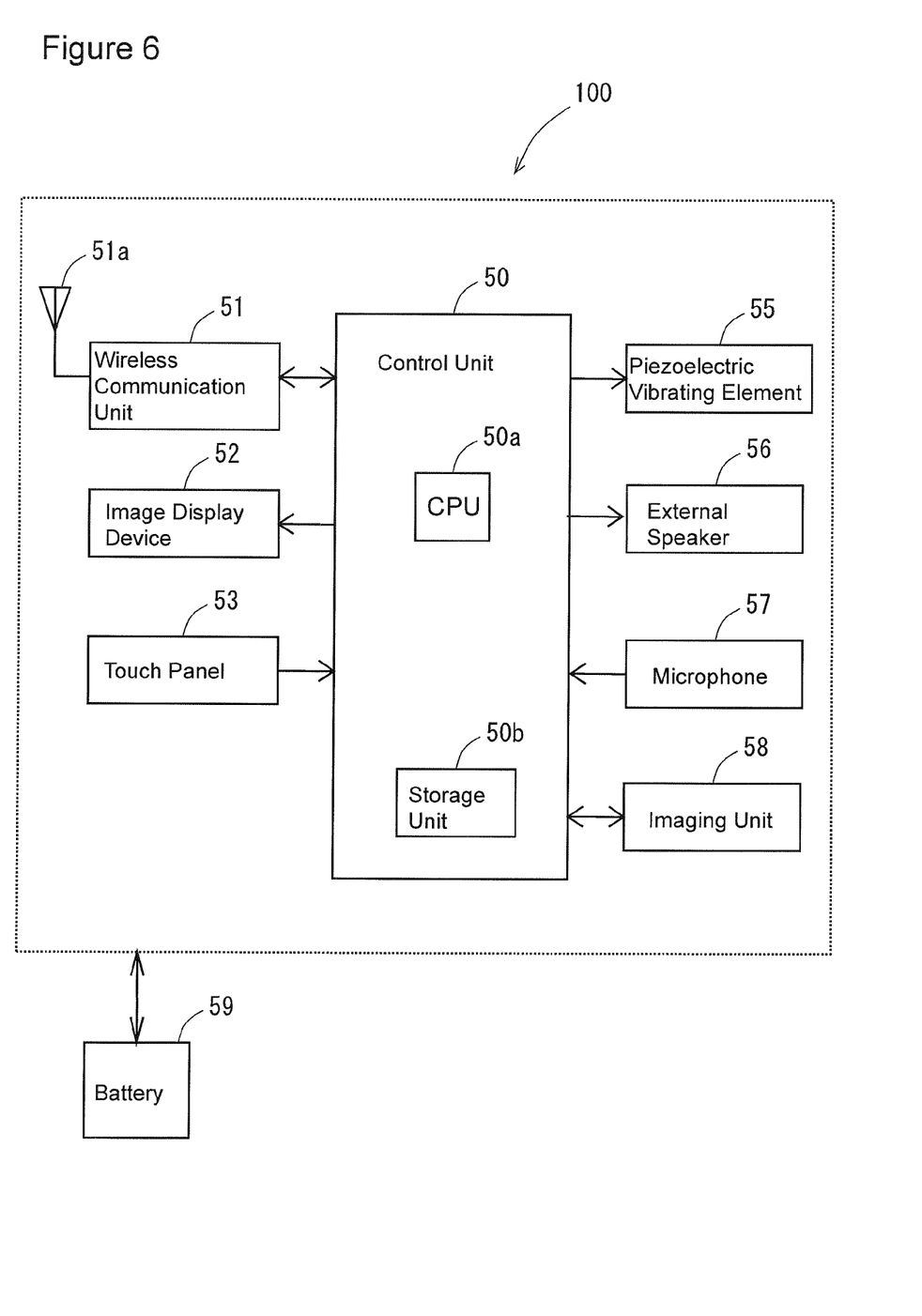
FIG. 6 is a block diagram illustrating an electronic configuration of the electronic apparatus.

FIG. 6 is a block diagram illustrating an electric configuration of the electronic apparatus 100. As illustrated in FIG. 6, the electronic apparatus 100 includes a control unit 50, a wireless communication unit 51, an image display device 52, a touch panel 53, a piezoelectric vibrating element 55, an external speaker 56, a microphone 57, an imaging unit 58, and a battery 59. These elements are accommodated in the apparatus case 3.

The control unit 50 includes a CPU 50a and a storage unit 50b. The control unit 50 manages overall operations of the electronic apparatus 100 by controlling other elements of the electronic apparatus 100. The storage unit 50b is configured of a ROM and a RAM. The CPU 50a executes various programs in the storage unit 50b. The control unit 50 receives diverse information from the respective elements and performs information processing. The CPU 50a generates heat during the information processing.

One potential benefit of having the light-transmissive plate 1 made out of sapphire with surface 1B having the step-terrace structure 60 (alternatively the sapphire cover plate) is improved heat emission. The thermal conductivity of the light-transmissive cover plate 1 made of sapphire is approximately 42 W/m·K and is greater than that of quartz glass whose thermal conductivity is 1 W/m·K. Because of the increased thermal conductivity, the heat emitted from the CPU 50a can be more effectively released outside of the apparatus case 3 through the light-transmissive cover plate 1. Additionally because the light-transmissive cover plate 1 has the step-terrace structure 60 as described above, the surface area is larger than it would be if the second surface 1B had a simple planar shape. Because the surface area of the second surface 1B, which is a surface that can emit heat to the outside, is increased due to the step-terrace structure 60, the amount of heat released from the light-transmissive cover plate 1 per unit time is greater than it would be if the second surface 1B had a simple planar shape. Since the heat generated from the CPU 50a can be more quickly released to outside of the apparatus case 3, the condition of the other components housed within the apparatus case 3 can be maintained more readily.

Moreover, since the light-transmissive cover plate 1 has the step-terrace structure 60, another potential benefit is that the adhesion of fingerprint stains due to sebum of the user's finger can be reduced when the second surface 1B of the light-transmissive cover plate 1 is operated by the user using a finger or the like. More specifically, since the light-transmissive cover plate 1 has a fine unevenness like the step-terrace structure 60, stains of the user's sebum may be easily dispersed along the lower ridge 61b of the unevenness. Consequently, even in a case where the user operates the second surface 1B of the light-transmissive cover plate 1 using a finger or the like, the sebum attached to the fingerprint is quickly dispersed on the second surface 1B. In this manner, so-called fingerprint stains which are conspicuous enough to be visually recognized can be reduced.

In terms of realizing high heat dissipation and reliably reducing attachment of the fingerprint stains, it is preferable that the terrace width be approximately 10 times to 1000 times greater than the step height of the step-terrace structure. For example, the step height of the step-terrace structure is preferably in the range of $1 \times 10^{-10}$ m to $1 \times 10^{-8}$ m, and the terrace width of the step-terrace structure is preferably in the range of $1 \times 10^{-9}$ m to $1 \times 10^{-7}$ m.

As described above, the light-transmissive cover plate 1 can be formed first by grinding and polishing the surface of sapphire in order to form a substrate member, which is the precursor of the light-transmissive cover plate 1. The precursor has a principal surface inclined from the a-plane of the sapphire (11-20) plane by approximately 0.5°. By performing a heat treatment on the precursor, the light-transmissive cover plate can be made.

In regards to the polishing, a first polishing, using a copper plate as a polishing pad and diamond abrasive grains having a grain diameter of approximately 1 μm to 3 μm as abrasive grains for mechanical polishing, is performed. Then, as a second polishing, chemical mechanical polishing (also known as CMP) using colloidal silica abrasive grains having a grain diameter of approximately 20 μm to 80 μm as abrasive grains for polishing may be performed. The substrate member is a precursor of the light-transmissive cover plate 1 and may be formed by performing these two stages of polishing. The substrate member has a principal surface approximately parallel to the a-plane of a sapphire crystal and in which the virtual line V perpendicular to the principal surface is inclined with respect to the m-axis in the sapphire.

In regards to the heat treatment, the substrate member formed through the polishing may be subjected to the heat treatment at 1000° C. for 3 hours using a heat treatment device. By such a heat treatment, the atoms on the surface of the substrate member, which is the precursor to the light-transmissive cover plate 1, are rearranged according to the crystal structure and a light-transmissive cover plate 1A having the step-terrace structure 60 can be formed. The inclined angle $\theta_A$ from the a-plane is preferably less than 1.5° in order to stably form the step-terrace structure 60 having a step height of $1 \times 10^{-10}$ m to $1 \times 10^{-8}$ m and a terrace width of $1 \times 10^{-9}$ m to $1 \times 10^{-7}$ m by performing the heat treatment.

In the above-discussed embodiment, the second surface 1B is a plane inclined from the a-plane in the sapphire (11-20) plane, and the virtual line V perpendicular to the second surface 1B is inclined with respect to the m-axis in the sapphire. However, the inclination direction of the principal surface of the sapphire is not limited to the above example. For example, the second surface 1B may also a plane inclined from the a-plane in the sapphire while the virtual line V perpendicular to the second surface 1B may be inclined with respect to a c-axis in the sapphire. The inclination direction is not limited to the examples discussed above.

Further, the second surface 1B may be a plane inclined from a c-plane of sapphire (0001) plane, and the magnitude of the inclined angle may not be particularly limited. However, in terms of capable of stably forming the step-terrace structure by the heat treatment, it is preferable that an inclined angle $\theta_c$ from the c-plane be less than 1.5°.

In a case where the second surface 1B is a plane inclined from the c-plane of the sapphire (0001) plane, the inclination direction also is not particularly limited. For example, the virtual line V perpendicular to the second surface 1B may be inclined with respect to an a-axis in the sapphire or it may be inclined with respect to the m-axis in the sapphire. Moreover, the second surface 1B may be a plane inclined from an r-plane of the sapphire (01-12) plane, and the magnitude of the inclined angle and the inclination direction are not limited to the examples discussed above.

Figure 7A:
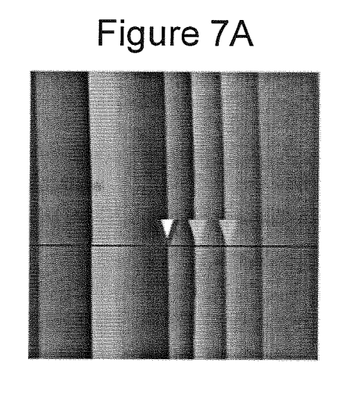
FIGS. 7A to 7C are surface profiles of the respective light-transmissive cover plates.

FIG. 7A illustrates image data of the surface profile measured by an atomic force microscope on the surface of the light-transmissive cover plate. In the measured light-transmissive cover plate, the second surface 1B is inclined from the a-plane in the sapphire by 0.3° and the virtual line V perpendicular to the second surface 1B is inclined with respect to the c-axis, that is in the direction toward the c-axis, in the sapphire. The contrasting density of the image represents the relative depth from the surface, with darker portions indicating positions that are further away from the surface. FIG. 7D illustrates a cross-sectional shape along the straight line illustrated in FIG. 7A.

Figure 7B:
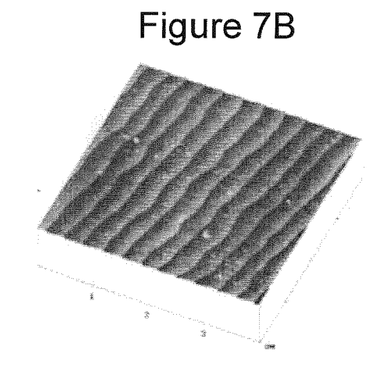

FIG. 7B illustrates image data of the surface profile measured by the atomic force microscope on the surface of the light-transmissive cover plate in which the second surface 1B is inclined from the c-plane in the sapphire by 0.3° and the virtual line V perpendicular to the second surface 1B is inclined with respect to the a-axis in the sapphire. FIG. 7E illustrates a cross-sectional shape along the straight line illustrated in FIG. 7B.

Figure 7C:
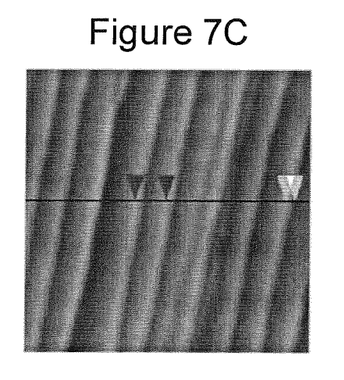
Figure 7D:
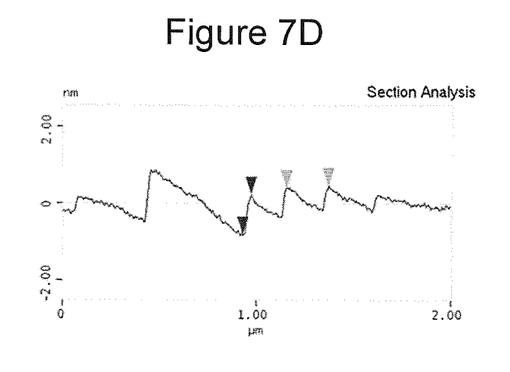
FIGS. 7D to 7F are cross-sectional shapes along the straight lines illustrated in FIGS. 7A to 7C, respectively.
Figure 7E:
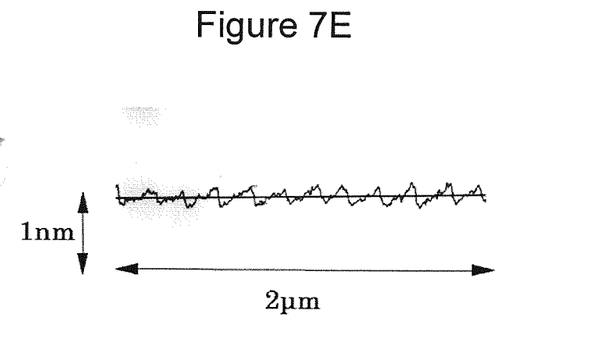
Figure 7F:
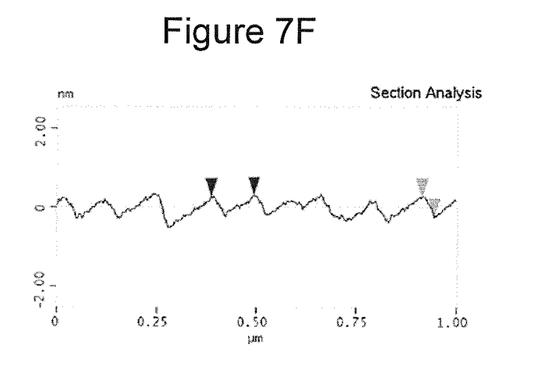

FIG. 7C illustrates image data of the surface profile measured by the atomic force microscope on the surface of the light-transmissive plate in which the second surface 1B is inclined from the r-plane in the sapphire by 0.4° and the virtual line V perpendicular to the second surface 1B is inclined with respect to the c-axis in the sapphire. FIG. 7F illustrates a cross-sectional shape along the straight line illustrated in FIG. 7C.

In all of the examples illustrated in FIGS. 7A to 7F, the terrace width W and the step height H are partially different from one another, but the average terrace width W is approximately $1 \times 10^{-8}$ m and the average step height H is approximately $1 \times 10^{-9}$ m.

The casing 2 constitutes the edge area of the front surface, the side surface, and the back surface of the electronic apparatus 100. In the present embodiment, the casing 2 is formed of a polycarbonate resin, but the case material is not particularly limited as long as the material is a member which covers the electronic apparatus. For example, a material which is the same as that of the light-transmissive cover plate 1 may be used for casing 2.

The image display device 52 is included in the inside of the electronic apparatus 100 as described above. The image display device 52 is controlled by the control unit 50 described below and displays image information indicating characters, symbols, and drawings on the image display surface 52a.

The image display device 52 is a so-called liquid crystal display panel. It has a backlight unit and a liquid crystal layer. As an LED lamp of the backlight unit, an LED lamp emitting white light, in which a luminescent material is mainly combined to a blue LED element, is used. The image information displayed on the image display device 52 is formed by white light which is emitted from an LED lamp of the backlight unit being colored by passing through the liquid crystal layer included in the image display device 52. That is, while the white light emitted from the LED lamp passes through the liquid crystal layer, a wavelength of the white light is limited, and then the image information indicating characters, symbols, and drawings having various colors and shapes is formed. The light indicating the image information formed in this manner is transmitted from the first surface 1A of the light-transmissive cover plate 1 to the second surface 1B and enters eyes of an operator of the electronic apparatus 100. The operator recognizes the characters, the symbols, and the drawings indicated by the image information.

As illustrated in FIG. 3, a speaker hole 20 and a microphone hole 21 are formed on a back surface 101 of the electronic apparatus 100, that is, the back surface of the apparatus case 3. Further, an imaging lens 58a included in an imaging unit 58 described below is exposed from the back surface 101 of the electronic apparatus 100.

The wireless communication unit 51 receives a signal using an antenna 51a from a communication device such as a web server connected to the Internet or a mobile phone different from the electronic apparatus 100 via a base station. The wireless communication unit 51 performs an amplification process and down conversion on the received signal and outputs the signal to the control unit 50. The control unit 50 performs demodulation processing or the like on the input received signal and acquires a sound signal indicating a voice or music included in the received signal. Further, the wireless communication unit 51 performs the amplification process and up-converting on a transmission signal including a sound signal or the like generated in the control unit 50, and transmits the transmission signal using an antenna 51a after the process. The transmission signal from the antenna 51a is received by a communication device connected to the Internet or a mobile phone different from the electronic apparatus 100 via the base station.

The image display device 52 is, for example, a liquid crystal image display device as described above and displays various pieces of information such as characters, signals, and drawings on the image display surface 52a under the control of the control unit 50. The light indicting image information displayed on the image display device 52 passes through the light-transmissive cover plate 1 and enters eyes of a user of the electronic apparatus 100, and accordingly the information can be recognized by the user of the electronic apparatus 100.

The touch panel 53 may be a projection type electrostatic capacitance touch panel and detects an operation of the user on the second surface 1B of the light-transmissive cover plate 1. The touch panel 53 is attached to the first surface 1A side of the light-transmissive cover plate 1 and includes two sheets each having a sensing electrode pattern which are arranged so as to face each other. Two sheets of sensing electrode pattern are bonded to each other using a transparent adhesive sheet.

A plurality of long and narrow X electrodes that extend along an X-axis direction (for example, a lateral direction of the electronic apparatus 100) and are arranged in parallel with each other are formed on one sensing electrode pattern sheet. A plurality of long and narrow Y electrodes which respectively extend along a Y-axis direction (for example, a vertical direction of the electronic apparatus 100) and are arranged in parallel with each other are formed in the other sensing electrode pattern sheet. When a finger of the user is touched on the second surface 1B of the light-transmissive cover plate 1, the electrostatic capacitance between an X electrode and a Y electrode positioned below the touched portion is changed so that the touch panel 53 detects the operation on the second surface 1B of the light-transmissive cover plate 1. The change in the electrostatic capacitance between the X electrode and the Y electrode, which is generated in the touch panel 53, is transmitted to the control unit 50. The control unit 50 specifies the content of the operation performed on the second surface 1B of the light-transmissive cover plate 1 based on the change in the electrostatic capacitance and performs an operation according to the specified contents.

The piezoelectric vibrating element 55 is an element for transmitting a reception sound to the user of the electronic apparatus 100. The piezoelectric vibrating element 55 is vibrated by a driving voltage applied by the control unit 50. The control unit 50 generates a driving voltage based on a sound signal indicating the reception sound and applies the driving voltage to the piezoelectric vibrating element 55. The piezoelectric vibrating element 55 is vibrated by the control unit 50 based on the sound signal indicating the reception sound and thus the reception sound is transmitted to the user of the electronic apparatus 100. In this manner, the control unit 50 functions as a driving unit allowing the piezoelectric vibrating element 55 to vibrate based on the sound signal. The piezoelectric vibrating element 55 will be described below in detail.

The external speaker 56 outputs the electric sound signal from the control unit 50 by converting the signal into a sound. The sound output by the external speaker 56 is output to the outside from speaker holes 20 provided on the back surface 101 of the electronic apparatus 100.

The microphone 57 outputs the sound input by the outside of the electronic apparatus 100 to the control unit 50 by converting a sound into the electric sound signal a sound. The sound from the outside of the electronic apparatus 100 is incorporated in the electronic apparatus 100 from microphone holes 21 provided on the back surface 101 of the electronic apparatus 100 and is input to the microphone 57.

The imaging unit 58 has the imaging lens 58a, an imaging element, and the like, and images a still image and a moving image based on the control of the control unit 50.

The battery 59 outputs a power source of the electronic apparatus 100. The power source output from the battery 59 is supplied to respective electronic components such as the control unit 50 or the wireless communication unit 51 in the electronic apparatus 100.

<Details of Piezoelectric Vibrating Element>

Figure 8:
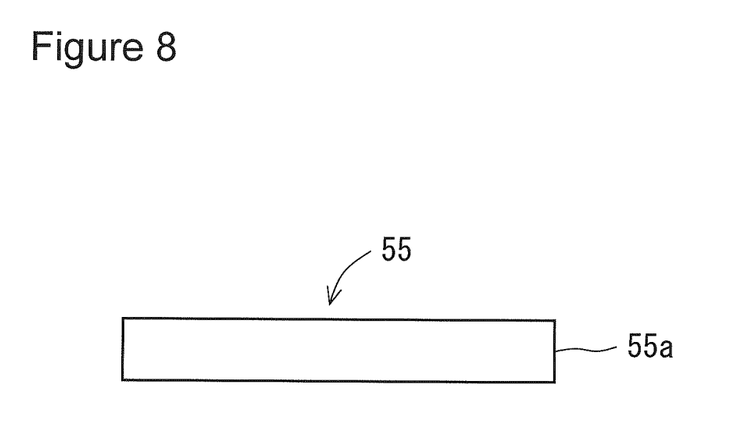
FIG. 8 is a top view illustrating a piezoelectric vibrating element.
Figure 9:
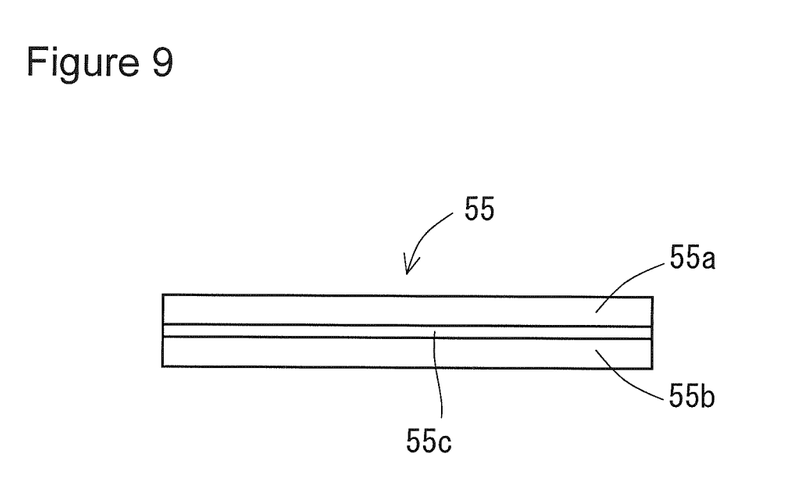
FIG. 9 is a side view illustrating the piezoelectric vibrating element.

FIGS. 8 and 9 are respectively a top view and a side view illustrating a structure of the piezoelectric vibrating element 55. As illustrated in FIGS. 8 and 9, the piezoelectric vibrating element 55 has a long shape in one direction. Specifically, the piezoelectric vibrating element 55 has a long and narrow rectangular plate shape in a plan view. The piezoelectric vibrating element 55 has, for example, a bimorph structure and includes a first piezoelectric ceramic plate 55a and a second piezoelectric ceramic plate 55b which are attached to each other through a shim material 55c.

In the piezoelectric vibrating element 55, when a positive voltage is applied to the first piezoelectric ceramic plate 55a and a negative voltage is applied to the second piezoelectric ceramic plate 55b, the first piezoelectric ceramic plate 55a extends along the longitudinal direction and the second piezoelectric ceramic plate 55b contracts along the longitudinal direction. Accordingly, as illustrated in FIG. 10, the piezoelectric vibrating element 55 is bent into a convex shape with the first piezoelectric ceramic plate 55a being outside.

Figure 11:
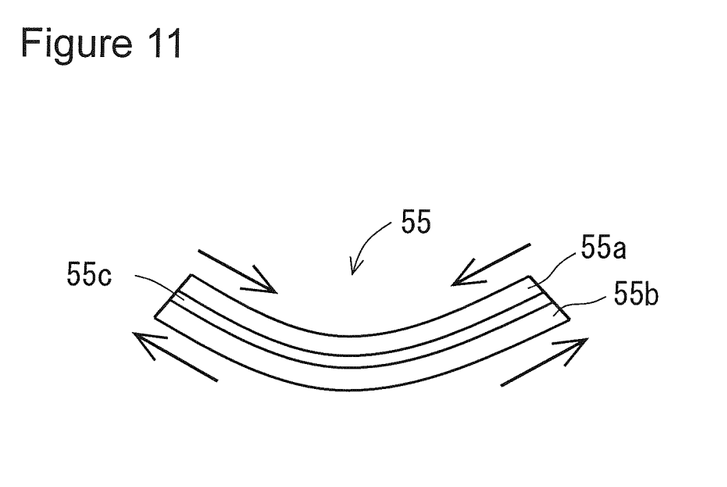
FIG. 11 is a side view illustrating a state of the piezoelectric vibrating element being bent.

In contrast, in the piezoelectric vibrating element 55, when a negative voltage is applied to the first piezoelectric ceramic plate 55a and a positive voltage is applied to the second piezoelectric ceramic plate 55b, the first piezoelectric ceramic plate 55a contracts along the longitudinal direction and the second piezoelectric ceramic plate 55b extends along the longitudinal direction. Accordingly, as illustrated in FIG.

11, the piezoelectric vibrating element 55 is bent into a convex shape with the second piezoelectric ceramic plate 55b being outside.

Figure 10:
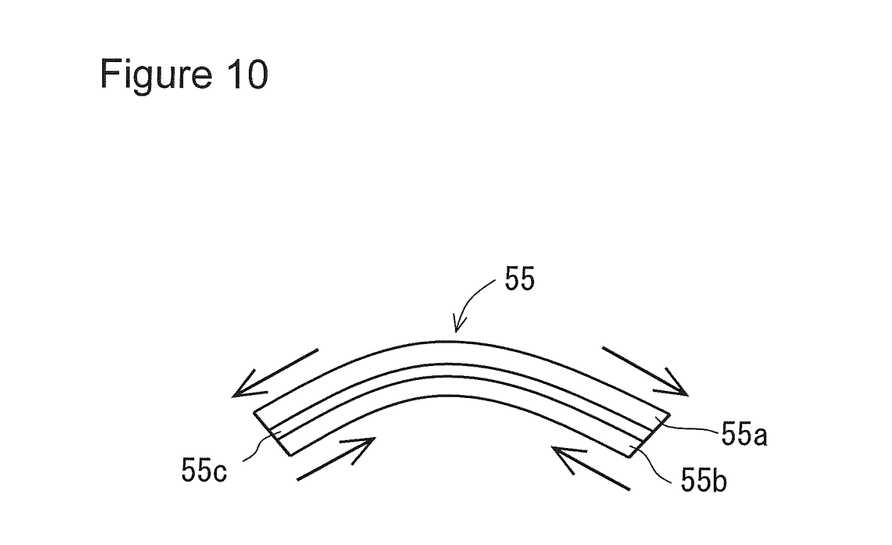
FIG. 10 is a side view illustrating a state of the piezoelectric vibrating element being bent.

The piezoelectric vibrating element 55 vibrates while being bent by alternatively taking the state of FIG. 10 and the state of FIG. 11. The control unit 50 allows the piezoelectric vibrating element 55 to vibrate while being bent by applying an AC voltage in which the positive voltage and the negative voltage alternatively appear at an area between the first piezoelectric ceramic plate 55a and the second piezoelectric ceramic plate 55b.

FIGS. 9 to 11 illustrates one structure made of the first piezoelectric ceramic plate 55a and the second piezoelectric ceramic plate 55b which are bonded to each other by interposing the shim material 55c therebetween in the piezoelectric vibrating element 55. However, a plurality of the structures may be laminated to each other.

<Arrangement Position of Piezoelectric Vibrating Element>

Figure 12:
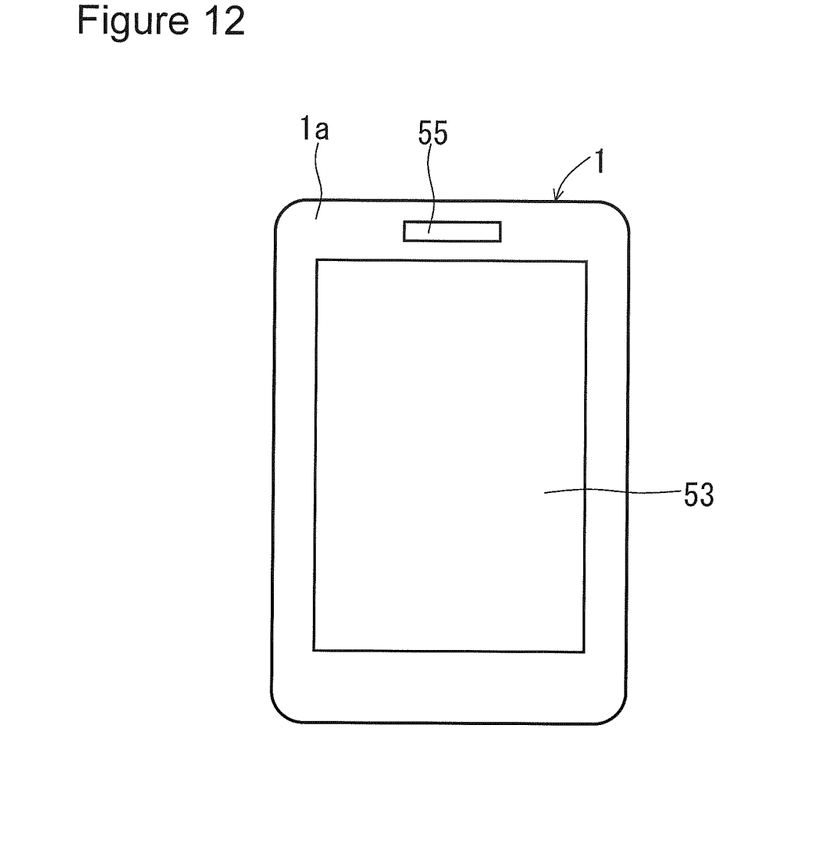
FIG. 12 is a front view illustrating the light-transmissive cover plate.

FIG. 12 is a plan view when the light-transmissive cover plate 1 is seen from the first surface 1A side. The piezoelectric vibrating element 55 is attached to the first surface 1A of the light-transmissive cover plate 1 using an adhesive such as a double-sided tape. The piezoelectric vibrating element 55 is arranged in a position which is not overlapped with the image display device 52 and the touch panel 53 when the piezoelectric vibrating element 55 is seen from side of the first surface 1A of the light-transmissive cover plate 1 in a plan view.

<Regarding Generation of Reception Sound Due to Vibration of Piezoelectric Vibrating Element>

In the present embodiment, an air conduction sound and a conduction sound are transmitted to the user from the light-transmissive cover plate 1 via the vibration of the piezoelectric vibrating element 55. That is, the vibration of the piezoelectric vibrating element 55 is transmitted to the light-transmissive cover plate 1 so that the air conduction sound and the conduction sound are transmitted to the user from the light-transmissive cover plate 1.

Here, the term "air conduction sound" means a sound recognized in a human brain by the vibration of an eardrum due to a sound wave or air vibration which enters an external auditory meatus hole (also known as an "ear hole"). On the other hand, the term "conduction sound" is a sound recognized in a human brain by the vibration of the eardrum due to the vibration of an auricle transmitted to the eardrum. Hereinafter, the air conduction sound and the conduction sound will be described in detail.

Figure 13:
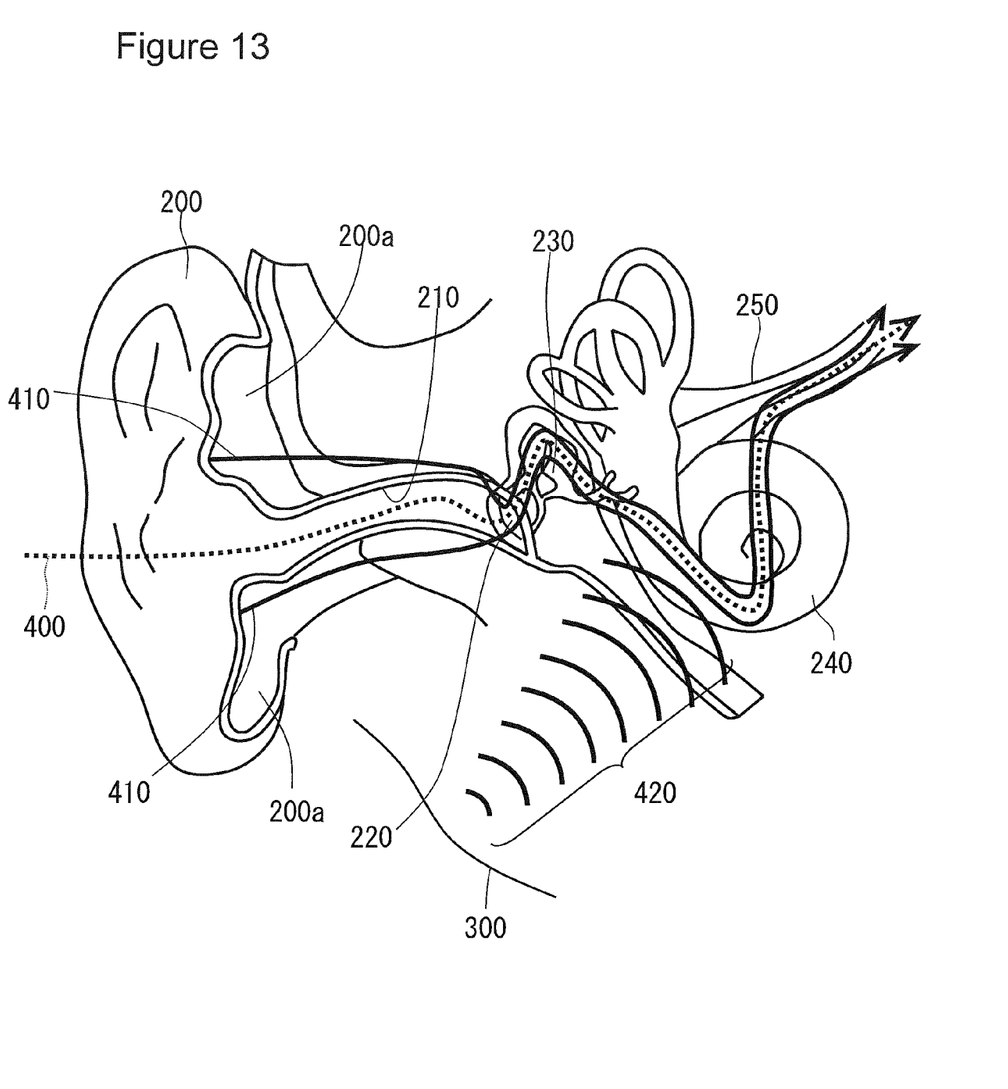
FIG. 13 is a view for describing an air conduction sound and a conduction sound.

FIG. 13 is a view for describing the air conduction sound and the conduction sound. FIG. 13 illustrates a structure of an ear of the user of the electronic apparatus 100. In FIG. 13, a wavy line 400 indicates a conduction path of a sound signal of the air conduction sound. A solid line 410 indicates the conduction path of the sound signal of the conduction sound.

When the piezoelectric vibrating element 55 mounted to the light-transmissive cover plate 1 vibrates based on the electric sound signal indicating the reception sound, the light-transmissive cover plate 1 vibrates and a sound wave is outputted from the light-transmissive cover plate 1. When the user moves the light-transmissive cover plate 1 of the electronic apparatus 100 close to an auricle 200 of the user by holding the electronic apparatus 100 in a hand or the light-transmissive cover plate 1 of the electronic apparatus 100 is put to the auricle 200 of the user, the sound wave output from the light-transmissive cover plate 1 enters an external auditory meatus hole 210. The sound wave from the light-transmissive cover plate 1 enters in the external auditory meatus hole 210 and the eardrum 220 vibrates. The vibration of the eardrum 220 is transmitted to au auditory ossicle 230 and the auditory ossicle 230 vibrates. In addition, the vibration of the auditory ossicle 230 is transmitted to a cochlea 240 and is converted into an electrical signal in the cochlea 240. The electrical signal is transmitted to the brain by passing through an acoustic nerve 250 and the reception sound is recognized in the brain. In this manner, the air conduction sound is transmitted from the light-transmissive cover plate 1 to the user.

When the user puts the light-transmissive cover plate 1 of the electronic apparatus 100 to the auricle 200 of the user by holding the electronic apparatus 100 in a hand, the auricle 200 is vibrated by the light-transmissive cover plate 1 which is vibrated by the piezoelectric vibrating element 55. The vibration of the auricle 200 is transmitted to the eardrum 220, and thus the eardrum 220 vibrates. The vibration of the eardrum 220 is transmitted to the auditory ossicle 230, and thus the auditory ossicle 230 vibrates. The vibration of the auditory ossicle 230 is transmitted to the cochlea 240 and is converted into an electrical signal in the cochlea 240. The electrical signal is transmitted to the brain by passing through the acoustic nerve 250 and the reception sound is recognized in the brain. In this manner, the conduction sound is transmitted from the light-transmissive cover plate 1 to the user. FIG. 13 illustrates an auricular cartilage 200a in the inside of the auricle 200.

In addition, the conduction sound herein is different from a bone conduction sound. The bone conduction sound is a sound recognized in a human brain by the vibration of the skull and direct stimulation of the inner ear such as the cochlea caused by the vibration of the skull. In FIG. 13, in a case of vibrating the jawbone 300, the transmission path of the sound signal while the bone conduction sound is recognized in the brain is indicated with a plurality of arcs 420.

In this manner, in the electronic apparatus 100 according to the present embodiment, the air conduction sound and the conduction sound can be transmitted from the light-transmissive cover plate 1 to the user of the electronic apparatus 100 due to the vibration of the light-transmissive cover plate 1 through the vibration of the piezoelectric vibrating element 55. Since the user can hear a sound when the user puts the light-transmissive cover plate 1 to the auricle 200 of the user, the communication using a telephone can be performed without concerning the position of the electronic apparatus 100 put against an ear so much. In addition, the user can hear the conduction sound due to the vibration of the auricle, the electronic apparatus 100 makes it easy for the user to hear the sound even when there is a large amount of the ambient noise. Accordingly, the user can appropriately perform communication using a telephone even when there is a large amount of the ambient noise.

In addition, even in a state in which earplugs or earphones are fixed to the ears of the user, the reception sound from the electronic apparatus 100 can be recognized by putting the light-transmissive cover plate 1 to the auricle. Further, even in the state in which headphones are fixed to the ears of the user, the reception sound from the electronic apparatus 100 can be recognized by putting the light-transmissive cover plate 1 to the headphones.

<Regarding Holes of Ear Piece (Holes for Receiver)>

In the electronic apparatus 100 according to the present embodiment, since the reception sound is generated by the vibration of the light-transmissive cover plate 1, the reception sound can be appropriately transmitted to the user even through there are no holes in the ear piece of the light transmissive cover plate 1. Therefore, the production cost of the light transmissive cover plate 1 can be reduced because the laser processing cost needed to make such holes can be eliminated. Further, since the light-transmissive cover plate 1 has no holes in the ear piece, the strength of the light-transmissive cover plate 1 may be higher. Furthermore, in the present embodiment, since there are no holes of the ear piece on the surface of the electronic apparatus 100, problems of water or dust entering the holes of the ear piece are reduced. Therefore, the necessity or the cost for a water-proof or dust-proof structure for solving the above-described problem is reduced.

In the above-described embodiment, a mobile phone case to which the present invention is applied is described as an embodiment. However, the present invention can be applied to an electronic apparatus other than the mobile phone. For example, embodiments may be applicable to tablets, e-readers, digital cameras, game consoles, digital music players, personal digital assistants (PDA), personal handy phone system (PHS), laptop computers, portable TV's, Global Positioning Systems (GPS's) or navigation systems, machining tools, pedometers, health equipment such as weight scales, display monitors, smartwatches, wearables, and the like. In addition, the present invention is not limited to the above-described embodiments, and various modifications and changes may be made in the range not departing from the scope of the present invention.

What is claimed is:

1. An electronic apparatus, comprising:
   an image display device; and
   a light-transmissive cover plate that includes a first surface facing the image display device and a second surface positioned on the opposite side of the first surface,
   wherein the light-transmissive cover plate is made of a single crystal that contains alumina ($Al_2O_3$) as a main component and has a step-terrace structure in at least a portion of the second surface,
   wherein the second surface is a plane inclined from a-plane in the single crystal which contains alumina ($Al_2O_3$) as a main component at an angle from the a-plane that is less than 1.5°, and
   wherein a virtual line perpendicular to the second surface is inclined with respect to a c-axis in the single crystal containing alumina ($Al_2O_3$) as a main component.

2. The electronic apparatus according to claim 1, wherein a step height of the step-terrace structure is in the range of $1\times10^{-10}$ m to $5\times10^{-8}$ m.

3. A light-transmissive cover plate made of sapphire as a main component for an electronic apparatus, comprising a first surface facing an image display device; and a second surface positioned on the opposite side of the first surface;
   wherein at least a portion of the second surface has a step-terrace structure,
   wherein the second surface is a plane inclined from a-plane in the sapphire at an angle from the a-plane that is less than 1.5°, and
   wherein a virtual line perpendicular to the second surface is inclined with respect to a c-axis in the sapphire.

4. A portable device, comprising:
   a casing;
   an image display device arranged in the casing; and
   a sapphire plate arranged to the casing that covers the image display device;
   wherein the sapphire plate has a step-terrace structure,
   wherein the second surface is a plane inclined from a-plane in the sapphire at an angle from the a-plane that is less than 1.5°, and
   wherein a virtual line perpendicular to the second surface is inclined with respect to a c-axis in the sapphire.

5. A portable device according to claim 4, wherein an inclined angle of the second surface with respect to the a-plane is approximately 0.5°.

6. The electronic apparatus according to claim 4, wherein the sapphire plate has a single crystal body and a virtual line perpendicular to the second surface of the sapphire plate is inclined with respect to a c-axis in the single crystal body.

7. The electronic apparatus according to claim 4, wherein a terrace width of the step-terrace structure is 10 times to 1000 times greater than a step height of the step-terrace structure.

8. A portable device, comprising:
   a casing;
   an image display device arranged in the casing; and
   a sapphire plate arranged to the casing that covers the image display device; and
   a piezoelectric vibrating element arranged on the sapphire plate that vibrates by a driving voltage based on a reception sound signal relating to telephone function,
   wherein the sapphire plate has a step-terrace structure.

9. A portable device according to claim 8, wherein the piezoelectric vibrating element vibrates for transmitting a conduction sound based on the reception sound signal.

10. A portable device according to claim 8, wherein the piezoelectric vibrating element vibrates for transmitting an air conduction sound by the vibration based on the reception sound.

11. A portable device according to claim 8, wherein the conduction sound and the air conduction sound are transmitted by the vibration of the sapphire plate transmitted by the vibration of the piezoelectric vibrating element.

12. A portable device according to claim 8, wherein the piezoelectric vibrating element has a long and narrow rectangular plate shape.

13. A portable device according to claim 8, wherein the piezoelectric vibrating element is arranged in a position which is not overlapped with the image display device.

14. An electronic apparatus, comprising:
    an image display device; and
    a light-transmissive cover plate that includes a first surface facing the image display device and a second surface positioned on the opposite side of the first surface; and
    a piezoelectric vibrating element arranged on the sapphire plate that vibrates by a driving voltage based on a reception sound signal relating to telephone function,
    wherein the light-transmissive cover plate is made of a single crystal that contains alumina ($Al_2O_3$) as a main component and has a step-terrace structure in at least a portion of the second surface.

15. A light-transmissive cover plate made of sapphire as a main component for an electronic apparatus, comprising:
    a first surface facing an image display device; a second surface positioned on the opposite side of the first surface;
    wherein at least a portion of the second surface has a step-terrace structure; and
    a piezoelectric vibrating element arranged on the sapphire plate that vibrates by a driving voltage based on a reception sound signal relating to telephone function.

* * * * *